Dec. 29, 1936. J. MUTZBAUER 2,065,721
HARVESTER
Filed Nov. 7, 1935 2 Sheets-Sheet 1
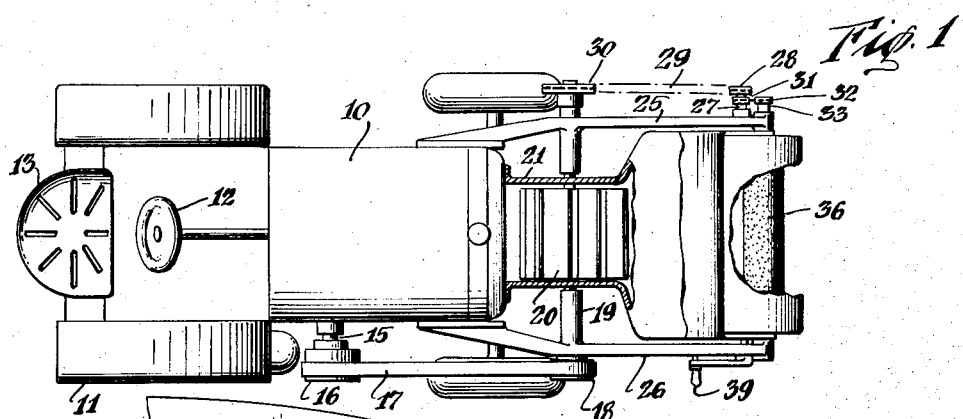
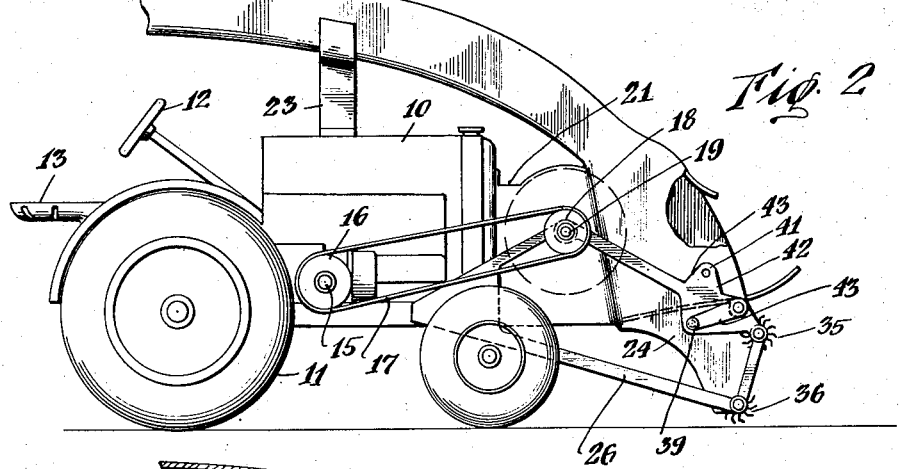
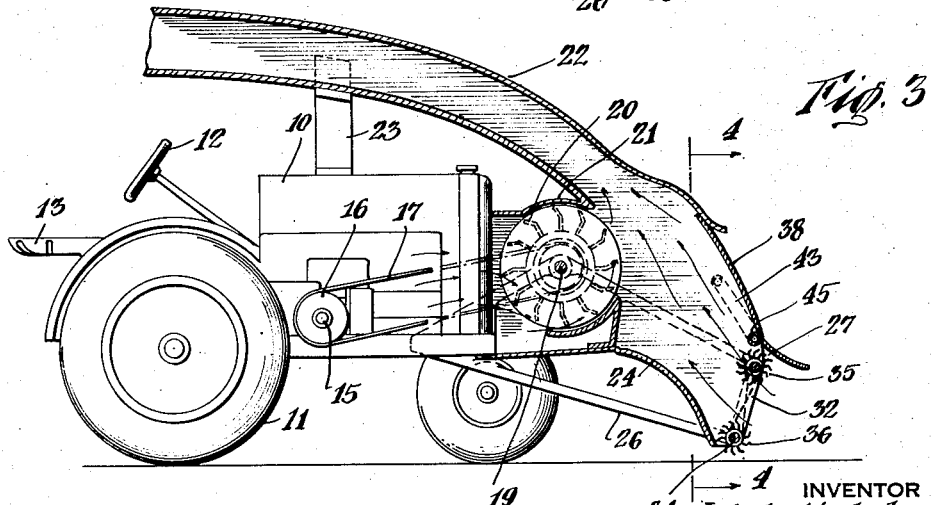
INVENTOR
Jakob Mutzbauer
BY
ATTORNEY Dec. 29, 1936.   J. MUTZBAUER   2,065,721
HARVESTER
Filed Nov. 7, 1935   2 Sheets-Sheet 2
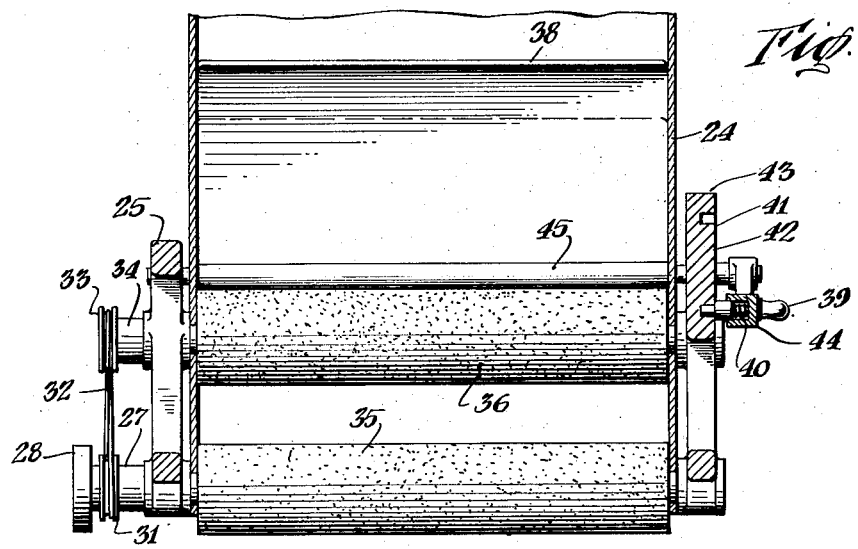
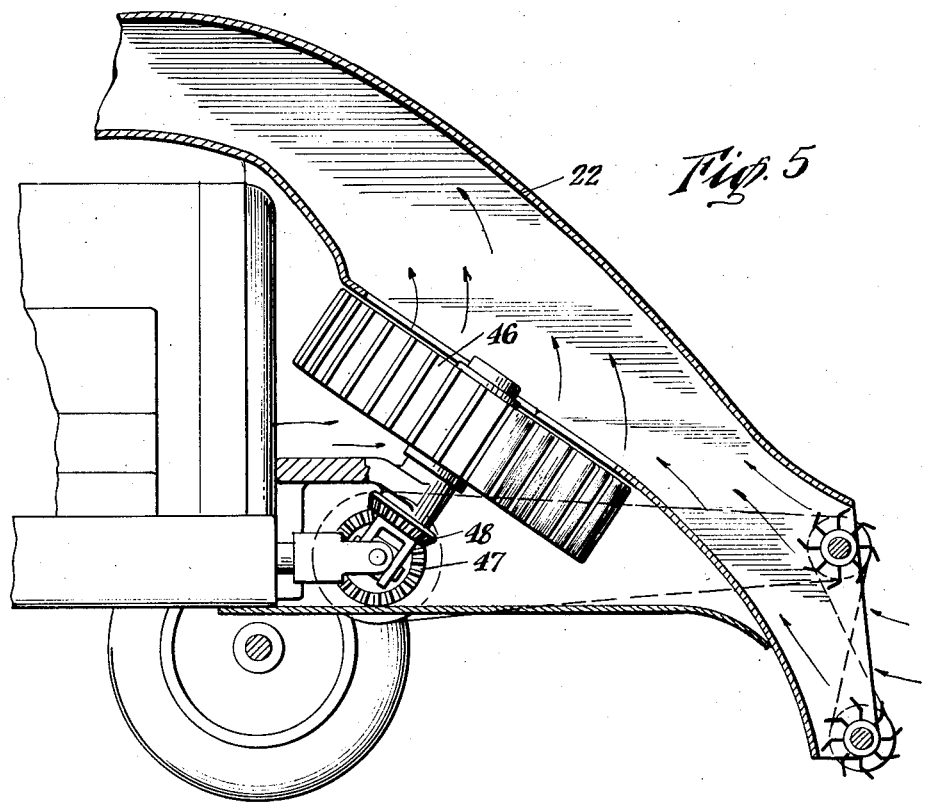
INVENTOR
Jakob Mutzbauer
BY
ATTORNEY Patented Dec. 29, 1936

2,065,721

UNITED STATES PATENT OFFICE 2,065,721

HARVESTER

Jakob Mutzbauer, New York, N. Y.

Application November 7, 1935, Serial No. 48,616

3 Claims. (Cl. 56—27)

This invention relates to improvements in harvesters for harvesting hay, grain or similar products of the field or crops to be gathered from the field and stored, and it is the principal object of my invention to provide a machine or apparatus which may equally well be used for the gathering of the field products from the field and for storing the same either in a vehicle or a loft.

Another object of my invention is the provision of a preferably motor driven wheeled machine or apparatus equipped with a suction fan operated from the motor of the vehicle and gathering the sheaves or stalks of grain and the swathes or bundles of cut grass or hay from the ground and elevating them through a suitable funnel or conduit into a vehicle.

A further object of my invention is the provision of a harvester which by means of a simple change may be readily converted into an apparatus for loading the grain or hay thus gathered from a vehicle onto a loft or stack.

A still further object of my invention is the provision of a harvester which during the transport of the crops from the field onto the loft contributes by the heat developed by the motor to the drying of the crops.

It is also one of the objects of my invention to provide an apparatus or machine of comparatively simple and therefore inexpensive construction, yet durable and highly efficient in operation which can be conveniently operated also by men not specifically instructed.

These and other objects and advantages of my invention will become more fully known as the description thereof proceeds, and will then be more specifically defined in the appended claims.

In the accompanying drawings forming a material part of this disclosure:

Fig. 1 is a top plan view of a harvester constructed according to my invention.

Fig. 2 is a fragmentary side elevation thereof.

Fig. 3 is a view, similar to Figure 2, partly in section.

Fig. 4 is a section on line 4—4 of Figure 3.

Fig. 5 is a side elevation, partly in section of a modified form of harvester.

As illustrated in Figures 1 to 4, a motor driven vehicle 10 on wheels 11 is steered by means of the steering wheel 12 in front of the driver's seat 13. A motor driven shaft 14 carries on the outside of the vehicle a pulley 16 over which a chain or belt 17 is guided which is also guided over a pulley 18 on a shaft 19 carrying a fan, preferably a suction fan 20 within a housing 21 attached to the front of the motor casing of the vehicle 10.

This casing 21 has a rearwardly and inclined upwardly extending funnel 22 supported by a post 23, and a forwardly and downwardly extending portion 24 of the casing is supported by the side braces or bars 25, 26 in which also the shaft 19 is journaled. The frame constituted by braces 25, 26 carries also a spindle 27 provided with a pulley 28 connected by means of a belt 29 or the like with a pulley 30 on driving shaft 19.

Shaft 27 carries a second pulley 31 over which a belt 32 or the like is guided also guided over a pulley 33 on shaft 34. Shafts 27 and 34 carry the gathering rollers 35 and 36 rotating in opposite directions in front of the open lower end of casing 24.

A door 38 in casing 24 is normally held in closed position as indicated in Figure 3, by means of a latch 39 controlled by a spring 40, and entering one or the other of the recesses 41 of a member 43, the latch casing 44 being secured to a shaft 45 about which the door turns. The purpose of this door is to close the open mouth of 24 when the machine is to be used for transferring the crops from a wagon to the loft, and the door will then occupy the position shown in dotted lines in Figure 2.

In the modified form of my device illustrated in Figure 5, the fan 46 is driven from the motor by the intermediary of the bevel gear 47 on the motor shaft in mesh with a bevel gear 48 on the fan shaft.

In operation when it is desired to gather the crops from the field the door 38 is closed against the outside as shown in Figure 3 and the suction fan will gather the material from the ground and drive it onto a wagon in front of the chute 22, while upon closure of the door 38 as shown in broken lines in Figure 2 with the apparatus located at the rear of a truck or vehicle onto which the crops are loaded, the fan will drive the material onto a loft, stack or other location to store the hay or grain.

It will be understood that I have described and shown the preferred forms of my device only as a few examples of the many possible ways to practically construct the same, and that I may make such changes in the general arrangement and in the construction of the minor details thereof as come within the scope of the appended claims without departure from the spirit of my invention and the principles involved.

Having thus described my invention, what I claim as new, and desire to secure by Letters Patent is:

1. A harvester comprising a motor driven, wheeled vehicle, a housing attached to said vehicle having an opening, an upwardly inclined chute combined with said housing, a suction fan driven from the motor of the vehicle in said housing, gathering rollers rotating in opposite directions at the opening in said housing to gather material from the ground to be transferred by said fan to a loader, a door normally closed in the wall of said chute, means to turn said door to close the passage from said opening into the chute and to present an opening in the wall of said housing facing the loader, the fan transferring said material gathered into said loader from the same through said opening in the housing wall to a storage compartment.

2. In a harvester a housing having an opening, a door normally closing said opening, and means to swing said door from its opening closing position into a position to separate said housing from the opening facing the ground, and a means to lock said door in either of its positions.

3. In a harvester including a motor driven vehicle and a means for gathering material from the ground, a housing on said vehicle having an opening in its side wall, a door for normally closing said opening and adapted to be swung inwardly, spring controlled means for locking said door in either of its positions, a suction fan in said housing driven from the motor of the vehicle, a rearwardly inclined and upwardly extending funnel or chute formed with said housing, and a forwardly and downwardly extending portion formed with said housing and having a lower mouth facing said material gathering means, connections between said material gathering means and the shaft of said fan to operate said means to elevate the gathered material through the mouth of said downwardly extending housing portion by the suction of said fan into said chute and to transfer the same to a truck during the normal closure of said door, a release of said door locking means allowing a turning of the door about its hinge into a position for closing the lower mouth of the housing portion and to transfer by means of the suction fan the material from the truck to a storage place.

JAKOB MUTZBAUER.